(12) United States Patent
Hyakudai et al.

(10) Patent No.: US 11,863,500 B2
(45) Date of Patent: Jan. 2, 2024

(54) COMMUNICATION APPARATUS, COMMUNICATIONS SYSTEM, AND COMMUNICATION METHOD

(71) Applicant: Sony Semiconductor Solutions Corporation, Kanagawa (JP)

(72) Inventors: Toshihisa Hyakudai, San Diego, CA (US); Satoshi Ota, Kanagawa (JP); Junya Yamada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 51 days.

(21) Appl. No.: 17/536,772

(22) Filed: Nov. 29, 2021

(65) Prior Publication Data
US 2022/0271910 A1    Aug. 25, 2022

Related U.S. Application Data

(60) Provisional application No. 63/153,536, filed on Feb. 25, 2021.

(51) Int. Cl.
*H04L 5/14*    (2006.01)
*H04L 5/00*    (2006.01)

(52) U.S. Cl.
CPC .............. *H04L 5/14* (2013.01); *H04L 5/0064* (2013.01)

(58) Field of Classification Search
CPC .................................. H04L 5/14; H04L 5/0064
See application file for complete search history.

(56) References Cited

U.S. PATENT DOCUMENTS

| 8,860,774 | B1* | 10/2014 | Sheeley | H04N 7/15 348/14.08 |
|---|---|---|---|---|
| 2007/0061433 | A1* | 3/2007 | Reynolds | H04L 47/10 709/223 |
| 2007/0237150 | A1* | 10/2007 | Wood | H04L 45/50 370/392 |
| 2008/0109579 | A1* | 5/2008 | Liu | G01R 31/31937 710/1 |
| 2012/0201138 | A1* | 8/2012 | Yu | H04L 47/2491 370/235 |

(Continued)

FOREIGN PATENT DOCUMENTS

| JP | H06245250 A | 9/1994 |
|---|---|---|
| JP | H09116520 A | 5/1997 |

(Continued)

*Primary Examiner* — Bailor C Hsu
(74) *Attorney, Agent, or Firm* — Michael Best & Friedrich LLP

(57) ABSTRACT

A communication apparatus includes: a communication unit that periodically transmits, with an interval assigned by TDD (Time Division Duplex) being one TDD time slot and a plurality of TDD time slots being one period, a plurality of application packets corresponding to a plurality of serial signals generated by a plurality of applications to a communication partner device; and a transmission control unit that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

21 Claims, 10 Drawing Sheets

1 : Communication system

(56) References Cited

U.S. PATENT DOCUMENTS

| | | | | |
|---|---|---|---|---|
| 2014/0181319 | A1* | 6/2014 | Chen | G06F 13/385 |
| | | | | 709/234 |
| 2015/0263916 | A1* | 9/2015 | Phillips | H04L 65/612 |
| | | | | 709/224 |
| 2015/0373075 | A1* | 12/2015 | Perlman | H04L 65/762 |
| | | | | 709/217 |
| 2017/0054688 | A1* | 2/2017 | Bhattacharjee | H04L 63/0254 |
| 2019/0057048 | A1* | 2/2019 | Chang | G06F 13/4286 |
| 2021/0400709 | A1* | 12/2021 | Namjoshi | H04W 72/23 |
| 2022/0006883 | A1* | 1/2022 | Srivastava | H04L 69/18 |

FOREIGN PATENT DOCUMENTS

| | | |
|---|---|---|
| JP | 2000209177 A | 7/2000 |
| JP | 2015519799 A | 7/2015 |
| JP | 2019004216 A | 1/2019 |

\* cited by examiner

COMMUNICATION APPARATUS, COMMUNICATIONS SYSTEM, AND COMMUNICATION METHOD

CROSS REFERENCE TO RELATED APPLICATIONS

This application claims the benefit of U.S. Priority Patent Application U.S. 63/153,536 filed Feb. 25, 2021, the entire contents of which are incorporated herein by reference.

BACKGROUND

The present disclosure relates to a communication apparatus, a communications system, and a communication method.

A technology for performing high-speed serial communication between a Master SerDes and a Slave SerDes has been proposed (see Japanese Patent Application Laid-open No. 2011-239011).

When serial communication is performed between two SerDeses, in the case where there is a large difference between the amount of data to be transmitted from one SerDes to the other SerDes and the amount of data to be transmitted from the other SerDes to the one SerDes, it is conceivable to adopt a TDD (Time Division Duplex) method to make the data transmission capacity different in the uplink direction and the downlink direction. The TDD method is a half-duplex communication method in which the communication in the uplink direction and the communication in the downlink direction cannot be performed at the same time and only communication in one direction can be performed.

SUMMARY

There is not only one serial communication standard, and there are various standards such as SPI (Serial Peripheral Interface), GPIO (General Purpose Input/Output), and I2C (Inter-Integrated Circuit). In the case where a plurality of types of serial signals of these different standards is transmitted/received between two SerDes using the TDD method, it is necessary to convert the serial signal of each standard into a packet conforming to the TDD method.

In the TDD method, a packet including a serial signal is transmitted/received in units of TDD time slots in some cases. In order to transmit/receive a plurality of types of serial signals of different standards, it is conceivable to generate a plurality of packets each including a plurality of types of serial signals, assign each packet to a different TDD time slot, and transmit the packet.

However, there is a problem that the transmission latency increases if the assignment of the TDD time slot is not optimized, because a plurality of types of serial signals of different standards has different transmission frequencies and different signal amounts for each type of serial signal. In particular, when a TDD time slot is assigned in a constant period to a packet including a serial signal having a low transmission frequency, there is a possibility that there is no packet to be transmitted in the assigned TDD time slot. Further, there is a possibility that when a TDD time slot is assigned to a packet including a serial signal having a low transmission frequency, the timing of transmitting a packet including a serial signal having a high transmission frequency is delayed, thereby increasing the transmission latency.

In this regard, in the present disclosure, there is provided a communication apparatus, a communications system, and a communication method that are capable of improving transmission efficiency while minimizing the transmission latency.

Solution to Problem

In accordance with an embodiment of the present disclosure, there is provided a communication apparatus including:

a communication unit that periodically transmits, with an interval assigned by TDD (Time Division Duplex) being one TDD time slot and a plurality of TDD time slots being one period, a plurality of application packets corresponding to a plurality of serial signals generated by a plurality of applications to a communication partner device; and a transmission control unit that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

The transmission control unit may change, for every one period, the priority of the part of application packets in a preset order or in accordance with user's designation.

The transmission control unit may change, for every one period, the priority of the part of application packets to be transmitted in the specific TDD time slot in order.

The transmission control unit may preferentially transmit a packet corresponding to an application having a higher priority in the specific TDD time slot.

The transmission control unit may check whether an application having a higher priority has prepared a packet to be transmitted in the specific TDD time slot, and check, if not prepared, whether or not an application having the next highest priority has prepared a packet to be transmitted in the specific TDD time slot.

The transmission control unit may repeat processing of checking whether or not a packet to be transmitted is prepared in descending order of priority until a packet that can be transmitted in the specific TDD time slot is found.

The transmission control unit may stop, where none of the part of applications have prepared a packet to be transmitted in the specific TDD time slot, transmitting a valid packet in the specific TDD time slot.

The transmission control unit may cause the one period to include a dedicated TDD time slot for transmitting a packet including a serial signal generated by an application designated in advance separately from the specific TDD time slot.

The application designated in advance may be an application other than the part of applications of the plurality of applications.

The transmission control unit may increase the number of dedicated TDD time slots included in the plurality of periods to be larger than the number of specific TDD time slots.

The part of applications may include at least one of an application that generates a packet of I2C (Inter-Integrated Circuit) communication or an application that generates a packet of GPIO (General Purpose Input/Output) communication, and the application designated in advance may include at least one of an application that generates a packet of SPI (Serial Peripheral Interface) communication or an application that generates a packet of OAM (Operation, Administration, Maintenance).

The transmission control unit may change, for every one period, the priority of the part of applications by one level, and make, where the priority has reached the lowest or the highest, the priority the highest or the lowest in the next period.

The transmission control unit may set, on the basis of at least one of a transmission frequency or a signal amount of a serial signal generated by each of the plurality of applications, whether to assign the dedicated TDD time slot to the corresponding application or share the specific TDD time slot with another application.

The communication apparatus may further include:
a plurality of encapsulators that is provided for each of the plurality of applications, generates a packet including a serial signal generated by the corresponding application, and outputs a ready signal indicating whether or not the packet has been generated; and
a frame construction unit that generates, on the basis of a plurality of packets generated by the plurality of encapsulators, a link frame to be transmitted to the communication partner device in the one period, in which
the frame construction unit may include a scheduler that manages the priority of the specific TDD time slot and determines, on the basis of two or more ready signals generated by two or more encapsulators corresponding to the part of applications, the application that transmits a packet in the specific TDD time slot.

The frame construction unit may include
a plurality of container makers that generates a container including a container payload and a container header, the container payload including a packet generated by each of the plurality of encapsulators, and
a multiplexer that selects, under control of the scheduler, a plurality of containers generated by the plurality of container makers one by one to generate the link frame.

The number of the plurality of container makers may be the same as the number of TDD time slots in the one period.

The communication apparatus may further include:
a plurality of encapsulators that is provided for each of the plurality of applications, generates a packet including a serial signal generated by the corresponding application, and outputs a ready signal indicating whether or not the packet has been generated;
a packet selection unit that manages the priority of the specific TDD time slot and selects, on the basis of two or more ready signals generated by two or more encapsulators corresponding to the part of applications, a packet to be transmitted in the specific TDD time slot from two or more packets generated by the two or more encapsulators; and
a frame construction unit that generates, on the basis of the packet selected by the packet selection unit and a packet corresponding to an application other than the part of applications of the plurality of applications, a link frame to be transmitted to the communication partner device in the one period, in which
the frame construction unit may include a scheduler that manages a packet to be transmitted in the plurality of TDD time slots in the one period.

The frame construction unit may include
a plurality of container makers that generates a container including a container payload and a container header corresponding to the container payload, the container payload including a packet selected by the packet selection unit and a packet corresponding to an application other than the part of applications of the plurality of applications, and
a multiplexer that selects, under control of the scheduler, a plurality of containers generated by the plurality of container makers one by one to generate the link frame.

The number of the plurality of container makers may be less than the number of TDD time slots in the one period.

In accordance with an embodiment of the present disclosure, there is provided a communications system including: a first communication apparatus that transmits/and receives a packet by TDD (Time Division Duplex) via a predetermined communication protocol; and a second communication apparatus, in which
the first communication apparatus includes
a communication unit that periodically transmits, with an interval assigned by TDD (Time Division Duplex) being one TDD time slot and a plurality of TDD time slots being one period, a plurality of application packets corresponding to a plurality of serial signals generated by a plurality of applications to a communication partner device, and
a transmission control unit that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot, and
the second communication apparatus includes a second communication unit that receives a packet transmitted from the first communication apparatus and periodically transmits a packet to the first communication apparatus with the plurality of TDD time slots being the one period.

In accordance with the present disclosure, there is provided a communication method including:
periodically transmitting, with an interval assigned by TDD (Time Division Duplex) being one TDD time slot and a plurality of TDD time slots being one period, a plurality of application packets corresponding to a plurality of serial signals generated by a plurality of applications to a communication partner device; and
changing, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, a communication apparatus, a communications system, and a communication method according to embodiments of the present disclosure will be described with reference to the drawings. Although main components of the communication apparatus and the communications system will be mainly described below, the communication apparatus and the communications system may have components and functions not shown or described. The following description does not exclude the components or functions not shown or described.

Figure 1:
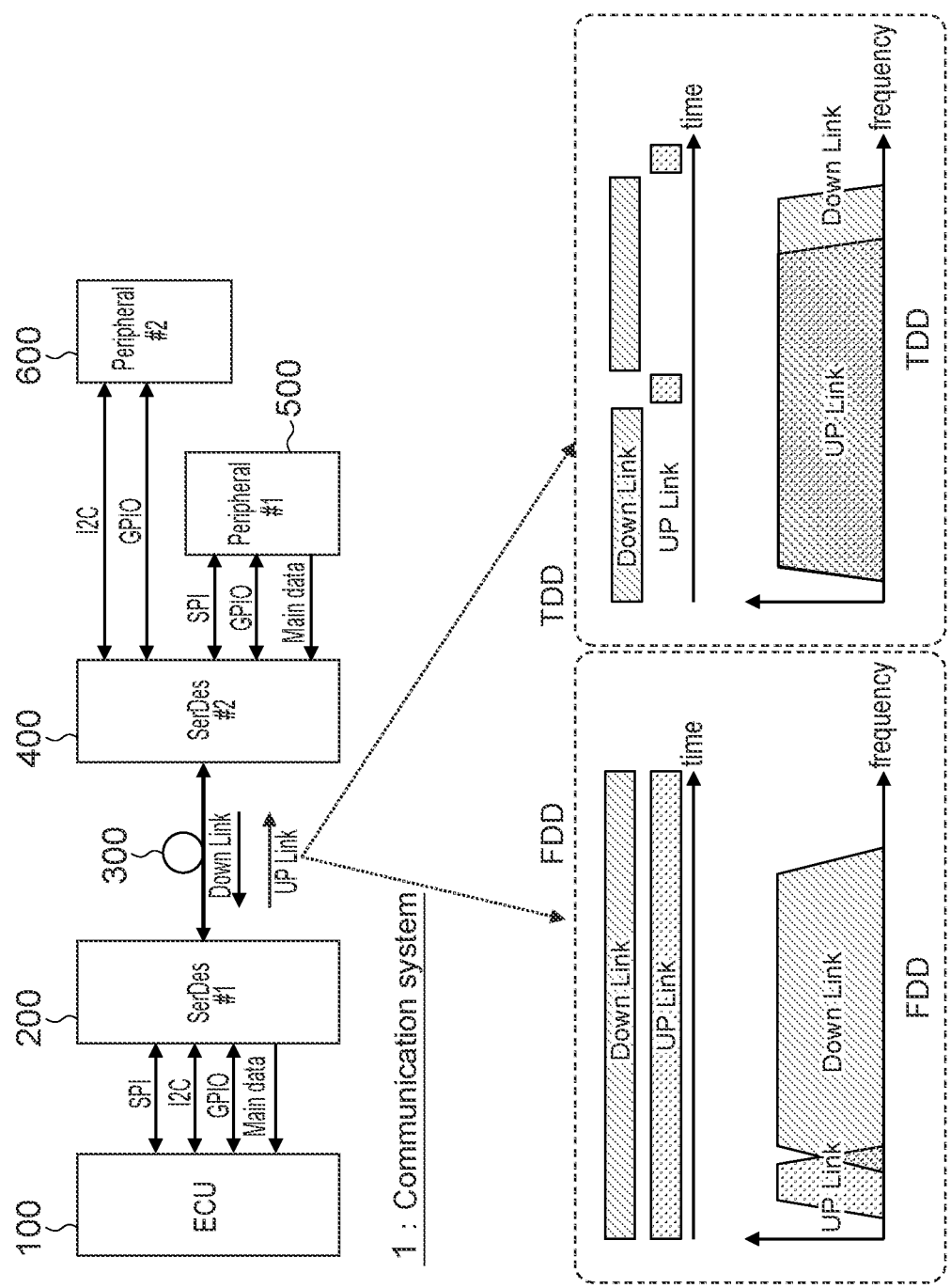
FIG. 1 is a block diagram showing a schematic configuration of a communications system.

A communications system according to an embodiment of the present disclosure performs serial communication between two SerDeses. FIG. 1 is a block diagram showing a schematic configuration of a communications system 1 including two SerDeses, i.e., a SerDes 200 (SerDes #1) and a SerDes 400 (SerDes #2). FIG. 1 shows an example in which the SerDes 200 and the SerDes 400 perform serial communication with each other. The SerDes 200 and the SerDes 400, which are high-speed serial interface devices, are connected to each other by a cable 300 having the length of several to ten and several meters. An ECU 100 is connected to the SerDes 200, and a peripheral device 500 (Peripheral #1) and a peripheral device 600 (Peripheral #2) are connected to the SerDes 400. The ECU 100 performs processing of receiving main data such as a video signal and transmitting the received data, and transmits/receives an SPI (Serial Peripheral Interface) signal, an I2C (Inter-Integrated Circuit) signal, a GPIO (general purpose IO) signal, or the like to control the whole system.

Meanwhile, the peripheral device 500 connected to the SerDes 400 transmits high-speed and large-capacity main data such as a video signal, and transmits/receives a control signal by SPI or GPIO. Further, the peripheral device 600 connected to the SerDes 400 transmits/receives a low-speed signal such as observation data and a control signal by I2C or GPIO.

The communications system including the two SerDeses 200 and 400 shown in FIG. 1 is provided in various apparatuses such as an in-vehicle camera module. As an interface technology for serial communication between the two SerDeses 200 and 400, FPD-LINK has been known. In addition, in a high-speed serial interface standard organization, Automotive SerDes Alliance (ASA), the standardization work of a high-speed serial interface technology for automobiles is currently in progress. The difference between FPD-LINK and ASA is that ASA uses Time Division Duplex (TDD) while FPD-LINK uses Frequency Division Duplex (FDD) as a method for realizing two-way communication.

The packet transmission timing and the frequency band of FDD are illustrated in the lower left of FIG. 1, and the packet transmission timing and the frequency band of ASA are illustrated in the lower right of FIG. 1. In FDD, a Down Link and an UP Link use difference frequency bands to transmit/receive packets in parallel during an overlapping period. Meanwhile, in TDD, a Down Link and an UP Link use an overlapping frequency band to transmit/receive packets in time division.

Figure 2:
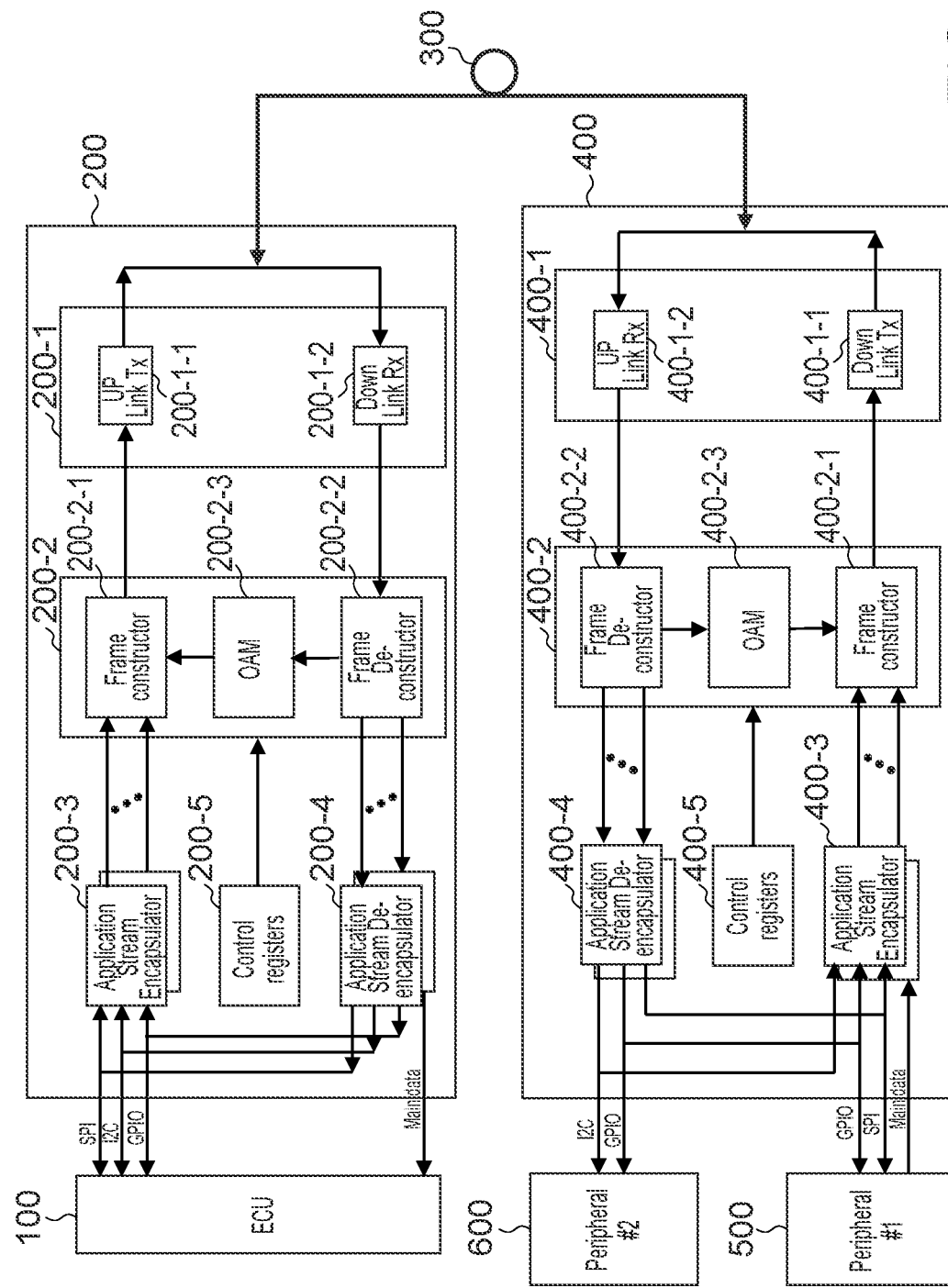
FIG. 2 is a block diagram of a communications system embodying the internal configuration of a SerDes.

FIG. 2 is a block diagram of the communications system 1 embodying the internal configuration of the SerDeses 200 and 400. FIG. 2 shows an example in which an application includes an SPI signal, an I2C signal, and a GPIO signal. As shown in FIG. 2, the SerDes 200 includes a PHY unit (PHY block) 200-1, a LINK unit (LINK block) 200-2, a plurality of encapsulators (Application Stream Encapsulators) 200-3, a plurality of de-encapsulators (Application Stream De-encapsulators) 200-4, and a control register (Control registers) 200-5. The PHY unit 200-1 includes an UP Link transmission unit (UP Link Tx) 200-1-1 and a Down Link transmission unit (Down Link Rx) 200-1-2. The LINK unit 200-2 includes a frame construction unit (Frame Constructor) 200-2-1, a frame deconstruction unit (Frame De-constructor) 200-2-2, and an OAM (Operation Administration Maintenance) unit 200-2-3.

The ECU 100 generates an SPI signal, an I2C signal, and a GPIO signal, which are control signals, as necessary for processing, and outputs the generated signal to the SerDes 200. The plurality of encapsulators 200-3 in the SerDes 200 is provided for each application (e.g., each of the SPI signal, the I2C signal, and the GPIO signal). Each of the encapsulators 200-3 generates a corresponding application packet.

The encapsulator 200-3 for an SPI signal receives an SPI signal from the ECU 100 and generates an application packet including the SPI signal. The encapsulator 200-3 for an I2C signal receives an I2C signal from the ECU 100 and generates an application packet including the I2C signal. The encapsulator 200-3 for a GPIO signal receives a GPIO signal from the ECU 100 and generates an application packet including the GPIO signal.

The plurality of de-encapsulators 200-4 in the SerDes 200 is provided for each application. The de-encapsulator 200-4 for main data restores main data from the received application packet and transmits the restored main data to the ECU 100. The de-encapsulator 200-4 for an SPI signal restores an SPI signal from the received application packet and transmits the restored SPI signal to the ECU 100. The de-encapsulator 200-4 for an I2C signal restores an I2C signal from the received application packet and transmits the restored I2C signal to the ECU 100. The de-encapsulator 200-4 for a GPIO signal restores a GPIO signal from the received application packet and transmits the restored GPIO signal to the ECU 100.

Figure 3:
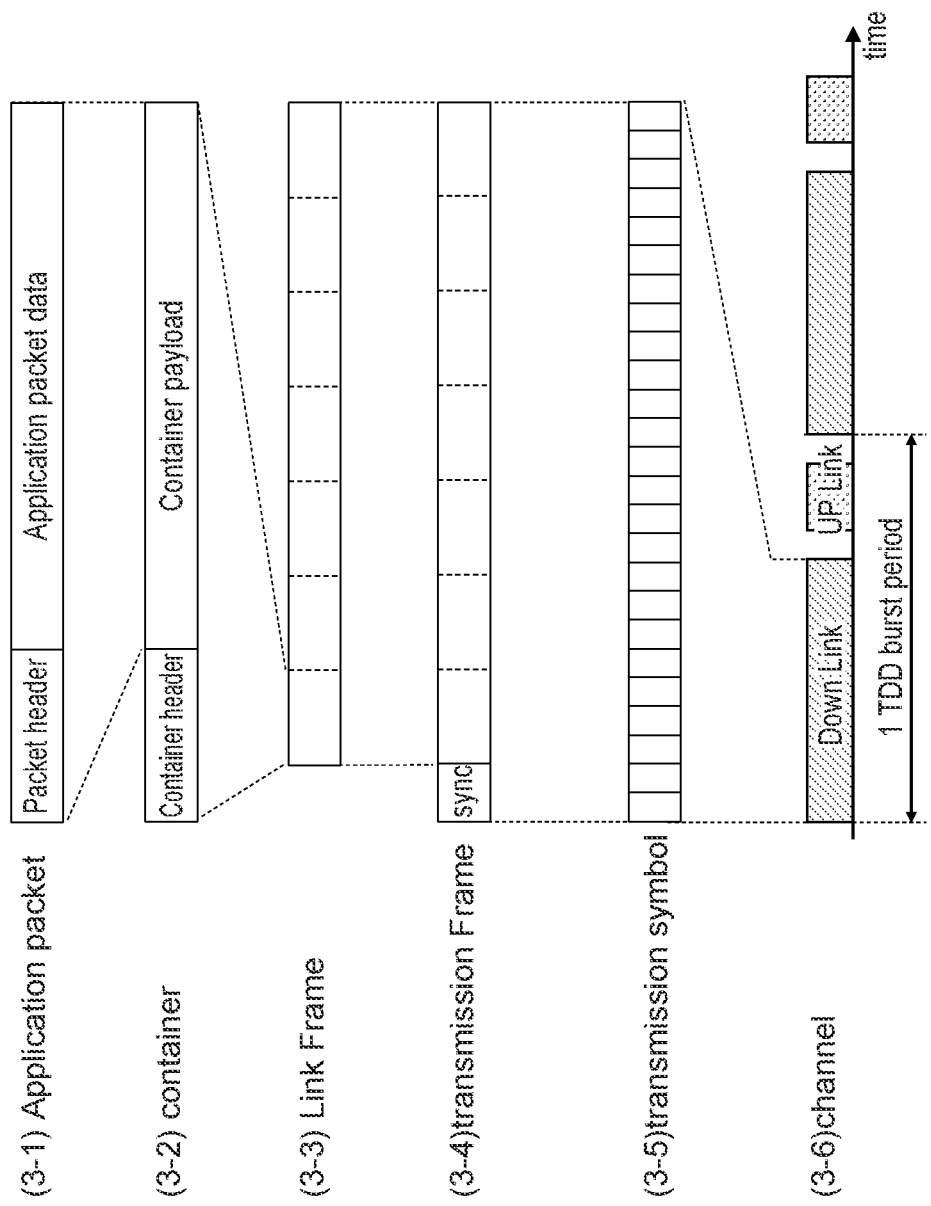
FIG. 3 is a diagram showing a configuration of a link frame and a transmission symbol transmitted by a PHY unit.

FIG. 3 is a diagram showing a configuration of an application packet generated by the plurality of encapsulators 200-3, a link frame generated by the LINK unit 200-2, and a transmission symbol to be transmitted by the PHY unit 200-1. As shown in Part (3-1) of FIG. 3, the application packet includes a packet header and application packet data.

The LINK unit 200-2 generates a container for each of the plurality of encapsulators 200-3, and generates a link frame including a plurality of containers. As shown in Part (3-2) of FIG. 3, the container includes a container header and a container payload. The container header includes address information of a device on the reception side supplied from the control register 200-5 and address information of the de-encapsulator 200-4.

The link frame generated by the LINK unit 200-2 is supplied to the UP Link transmission unit 200-1-1 of the PHY unit 200-1. The UP Link transmission unit 200-1-1 adds a sync header that is necessary for synchronization processing on the reception side to the link frame ((3-3) in FIG. 3) to generate a transmission frame ((3-4) in FIG. 3), and then performs modulation processing such as binary transmission (NRZ) and quadrature transmission (PAM4) to convert the transmission frame into a transmission symbol ((3-5) in FIG. 3) and outputs the obtained transmission symbol to the cable 300. This is the transmission processing on the UP Link side.

One transmission frame ((3-4) in FIG. 3) is transmitted within one TDD time slot of a TDD method. In the TDD method, Down Link transmission and UP Link transmission are performed once at different timings within one TDD burst period. The above-mentioned transmission frame is transmitted within, for example, a Down Link transmission period. For example, in the case where the UP Link transmits only a control signal and the Down Link transmits a video signal including a control signal, or the like, the Down Link basically occupies a larger amount of time and the time ratio is 1:several tens.

Figure 4:
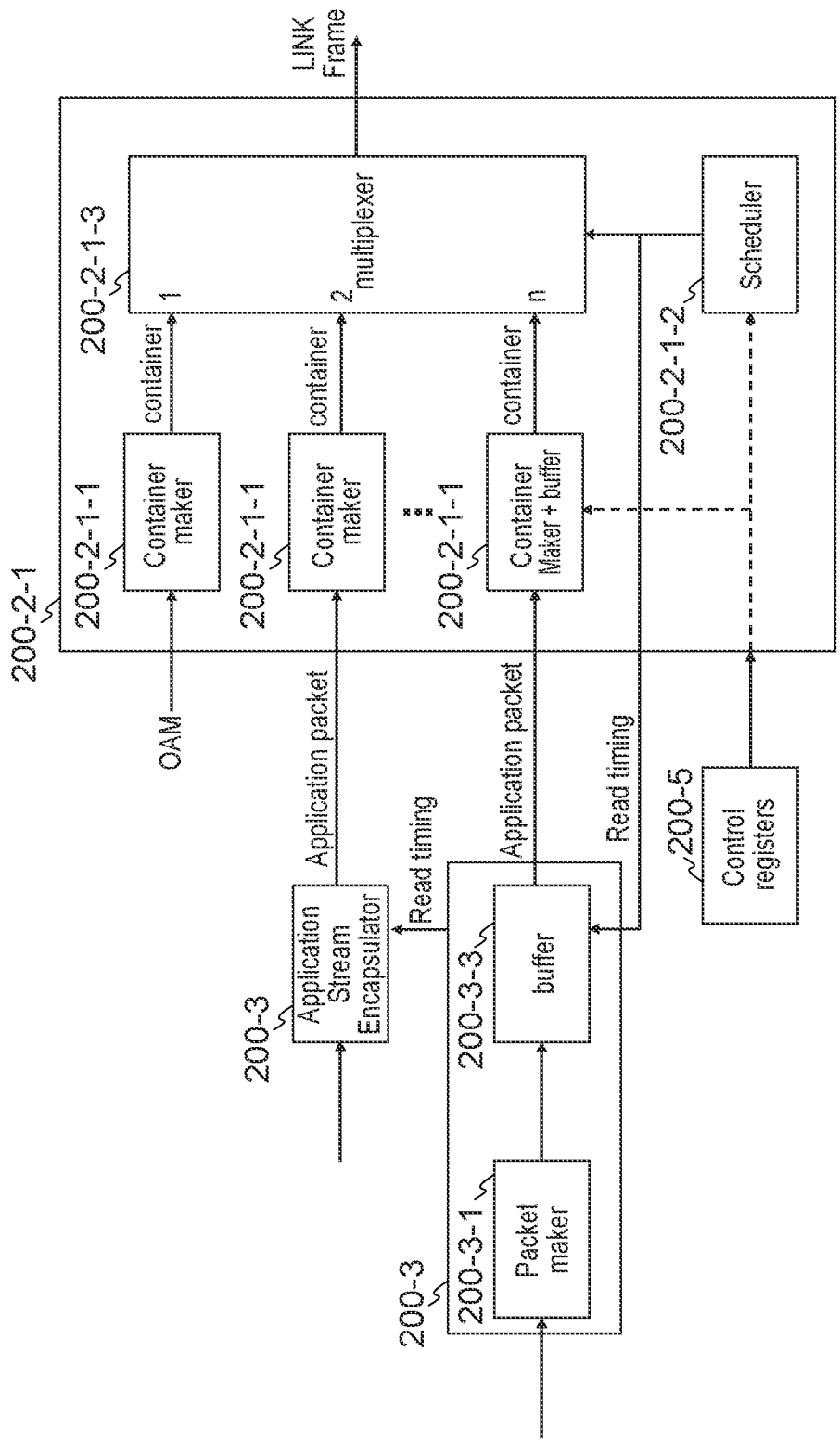
FIG. 4 is a block diagram showing an internal configuration of a frame construction unit in the SerDes in FIG. 2.

FIG. 4 is a block diagram showing the internal configuration of the frame construction unit 200-2-1 in the SerDes 200 in FIG. 2. The frame construction unit 200-2-1 includes a plurality of container makers (container makers) 200-2-1-1 corresponding to the plurality of encapsulators 200-3, a multiplexer 200-2-1-3, and a scheduler 200-2-1-2. Each of the encapsulators 200-3 includes a packet maker (Packet maker) 200-3-1 and a buffer 200-3-3. The application packet generated by the packet maker 200-3-1 is once stored in the buffer 200-3-3 and then input to the corresponding container maker 200-2-1-1 in the frame construction unit 200-2-1 in accordance with an instruction from the scheduler 200-2-1-2.

Each of the container makers 200-2-1-1 receives a corresponding application packet from the corresponding encapsulator 200-3 or the OAM unit 200-2-3 to generate a corresponding container. The container generated by each of the container makers 200-2-1-1 is input to the multiplexer 200-2-1-3. The scheduler 200-2-1-2 outputs a timing adjustment signal indicating at which timing each container is output. The multiplexer 200-2-1-3 generates a link frame including a plurality of containers on the basis of the timing adjustment signal from the scheduler 200-2-1-2.

At system startup, a schedule according to the transmission band required by an application to be transmitted by the ECU 100 is transferred to the control register 200-5 by some means not shown in FIG. 2. The control register 200-5 supplies the schedule to the scheduler 200-2-1-2. Therefore, control is performed such that the container for transmitting wideband information such as a video signal is selected more often by the multiplexer 200-2-1-3 per unit time and a low-speed signal such as GPIO is selected less often.

Similarly, an OAM signal including the schedule generated by the ECU 100 is supplied also to the scheduler in a frame construction unit 400-2-1 of the SerDes 400 via the UP Link.

Next, the reception processing on the UP Link side of the SerDes 400 will be described. As shown in FIG. 2, the SerDes 400 includes a PHY unit (PHY block) 400-1, a LINK unit (LINK block) 400-2, a plurality of encapsulators (Application Stream Encapsulator) 400-3, a plurality of de-encapsulators (Application Stream De-encapsulator) 400-4, and a control register (Control registers) 400-5. The PHY unit 400-1 includes a Down Link transmission unit (Down Link Tx) 400-1-1 and an UP Link reception unit (UP Link Rx) 400-1-2. The LINK unit 400-2 includes a frame construction unit 400-2-1, a frame deconstruction unit 400-2-2, and an OAM unit 400-2-3.

The encapsulator 400-3 for main data receives main data from the peripheral device 500 and generates an application packet including the main data. The encapsulator 400-3 for an SPI signal receives an SPI signal from the peripheral device 500 and generates an application packet including the SPI signal. The encapsulator 400-3 for a GPIO signal receives a GPIO signal from the peripheral device 500 and generates an application packet including the GPIO signal. The de-encapsulator 400-4 for an I2C signal restores an I2C signal from the received packet and transmits the restored I2C signal to the peripheral device 600. The de-encapsulator 400-4 for a GPIO signal restores a GPIO signal from the received packet and transmits the restored GPIO signal to the peripheral device 600.

The SerDes 400 generates a lock synchronized with a symbol frequency with the sync signal added to the top of the transmission symbol ((3-5) in FIG. 3) received from the SerDes 200 to reproduce the transmission frame ((3-4) in FIG. 3). The sync header is removed from the reproduced transmission frame ((3-4) in FIG. 3) to generate the link frame ((3-3) in FIG. 3) and the generated link frame is input to the frame deconstruction unit 400-2-2 in the LINK unit 400-2.

The frame deconstruction unit 400-2-2 divides the link frame ((3-3) in FIG. 3) into containers ((3-2) in FIG. 3), acquires address information of the de-encapsulator 400-4 from the container header of each container, and outputs, to the corresponding de-encapsulator 400-4, the application packet ((3-1) in FIG. 3) included in the container payload of the container.

Each of the de-encapsulators 400-4 reconstructs, on the basis of the packet header in the corresponding application packet, the application packet data in the application packet into the format of each application and outputs the obtained data to the corresponding peripheral device 500 or 600.

Since the processing on the Down Link side in which information is transmitted from the peripheral device 500 or 600 to the ECU 100 is similar to the processing on the UP Link side, description thereof is omitted.

In the ASA standard of a TDD method, the number of times per unit time and the transmission order for transmitting a container ((3-2) in FIG. 3) that stores each application to be transmitted are determined in advance at the time of system design. As a result, the latency for each application becomes substantially constant and problems such as transmission jitter of an application are avoided. This is very convenient in the case where large-capacity data such as a video signal is constantly transmitted. Meanwhile, the transmission band required by each of an SPI signal, an I2C signal, and a GPIO signal for mainly controlling a peripheral device may be narrower than that of the video signal.

Figure 5:
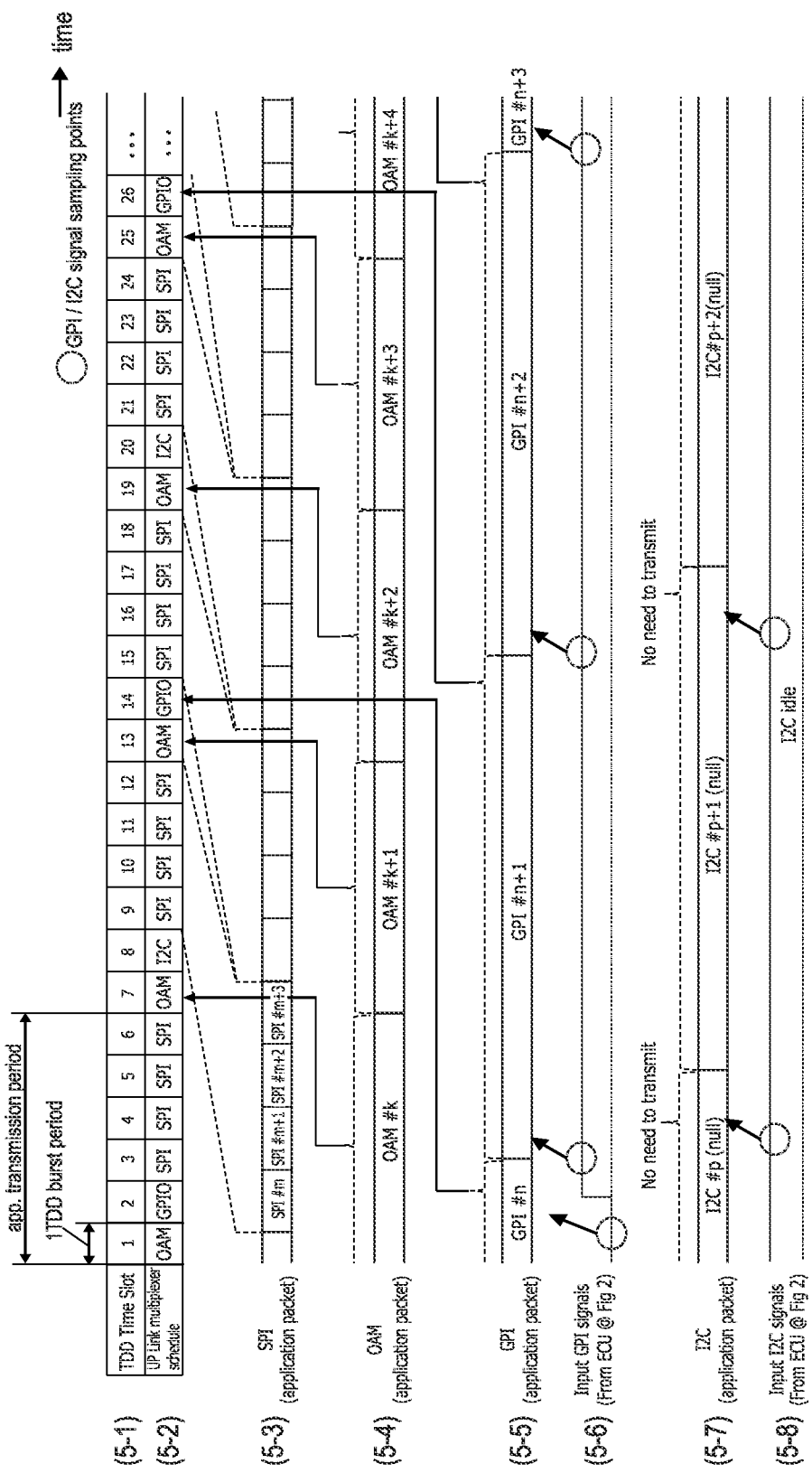
FIG. 5 is a diagram showing a transmission timing of the SerDes in FIG. 2.

FIG. 5 is a diagram showing the transmission timing of the SerDes 200 in FIG. 2. FIG. 5 shows an example in which the frame construction unit 200-2-1 on the UP Link side sets the transmission schedule of each application packet With 6 TDD time slots as one period. As shown in FIG. 5, the time of one switching between the Down Link and the UP Link is the transmission time unit of TDD (1 TDD burst period=1 TDD time slot). In the example of FIG. 5, one application packet is transmitted for each TDD time slot in the UP Link ((5-1) in FIG. 5). In this case, the application packet including an OAM signal is transmitted once every 6 TDD time slots, an application packet including an SPI signal is transmitted four times every 6 TDD time slots, and an application packet including a GPIO signal and an application packet including an I2C signal are transmitted once every 12 TDD time slots ((5-2) in FIG. 5).

As shown in FIG. 2 to FIG. 4, the SPI signal, the I2C signal, and the GPIO signal to be input to the SerDes 200 are once input to the encapsulator 200-3, converted into a corresponding application packet, and then, buffered and input to the frame construction unit 200-2-1 in accordance with the read timing of the scheduler 200-2-1-2. The read timing determined by the scheduler 200-2-1-2 coincides with the transmission schedule of each application shown in Parts (5-1) and (5-2) of FIG. 5. For example, application packets SPI #m and #m+1 of an SPI signal are respectively transmitted in TDD time slots #9 and #10 ((5-3) in FIG. 5), and application packets GPI #n and #n+1 of a GPIO signal ((5-5) in FIG. 5) are respectively transmitted in TDD time slots #14 and #26 ((5-2) in FIG. 5).

However, since the I2C signal is in an adle state at this time point ((5-8) in FIG. 5), there is no need to transmit an application packet of an I2C signal ((5-8) in FIG. 5).

Figure 6:
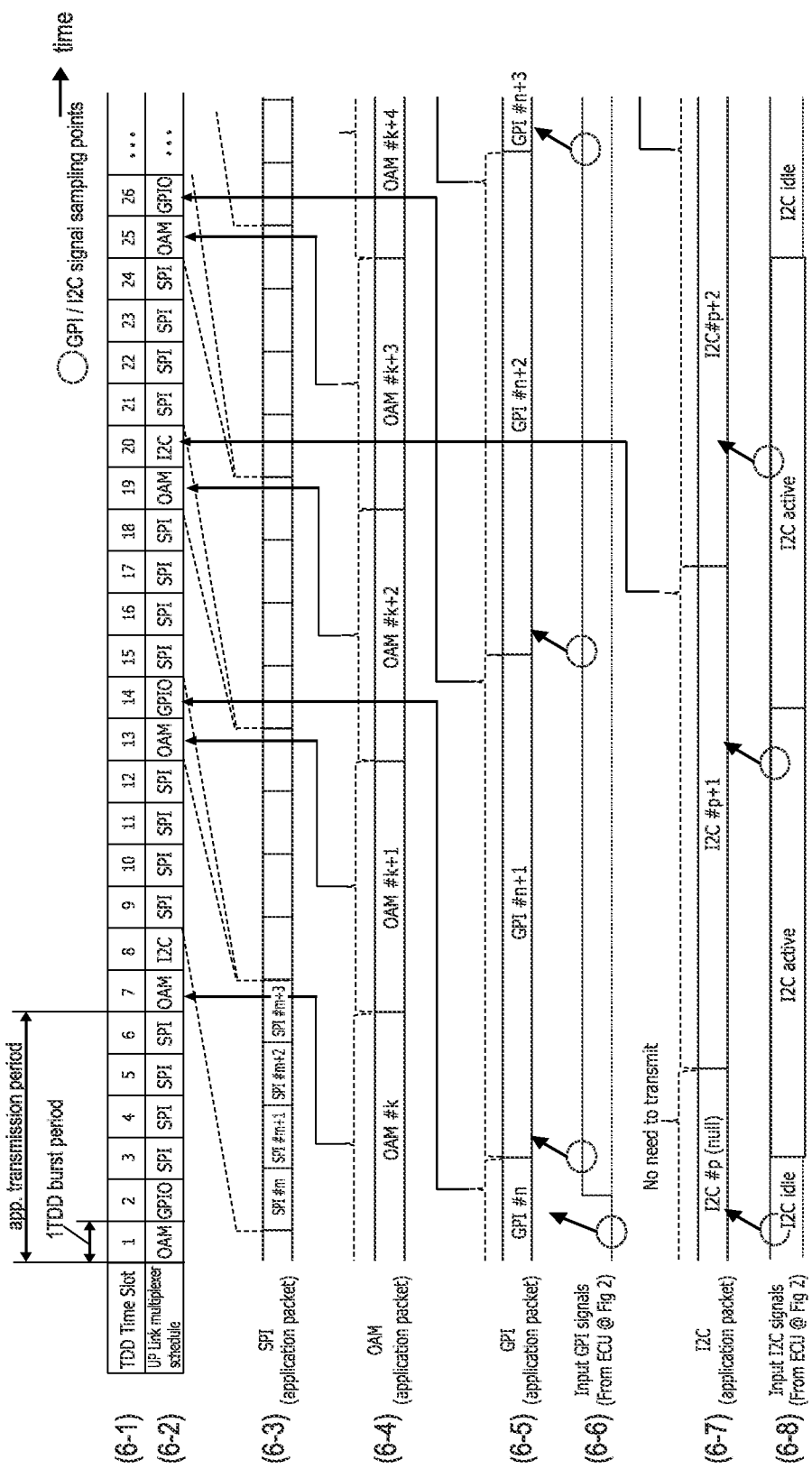
FIG. 6 is a diagram showing a transmission timing in the case where an I2C signal has been input from an ECU to the SerDes.

FIG. 6 is a diagram showing the transmission timing in the case where an I2C signal has been input from the ECU 100 to the SerDes 200. In the case of FIG. 6, an application packet of an I2C signal is transmitted in a TDD time slot #20.

Now, assumption is made that a signal such as an interrupt signal, which requires a small transmission band but whose change in the signal state cannot be predicted in advance is transmitted using a GPIO signal. As shown in FIG. 5, assumption is made that since the band required for transmitting a GPIO signal is small, TDD time slots are assigned such that the GPIO signal is transmitted once every 12 TDD time slots. In this case, the change in the GPI signal ((5-6) in FIG. 5) input from the ECU 100 is sampled at intervals of 12 TDD time slots and converted into packets GPI #n and #n+1 ((5-5) in FIG. 5) of a GPIO signal, and the packets are respectively transmitted in TDD time slots #14 and #26 ((5-2) in FIG. 5).

The change in the GPI signal ((5-6) in FIG. 5) input from the ECU 100 has occurred near TDD time slots #2 to #3, but the timing at which this change is packetized and transmitted is a TDD time slot #26, which causes transmission latency. For example, in the case where 1 TDD burst period is approximately 30 usec, transmission latency of approximately 690 usec occurs.

In order to reduce the transmission latency of an application, it only needs to increase the frequency of assigning a TDD time slot to the application. However, since the application does not constantly transmit a signal and transmits a signal only as necessary, the efficiency of using the TDD time slot deteriorates in the case where the required transmission band is small.

In this regard, the communication apparatus and the communications system according to the embodiment of the present disclosure are characterized in that the transmission efficiency is improved while minimizing the transmission latency when transmitting, by a TDD transmission method, a plurality of applications to which a transmission schedule has been assigned in advance.

First Embodiment

Figure 7:
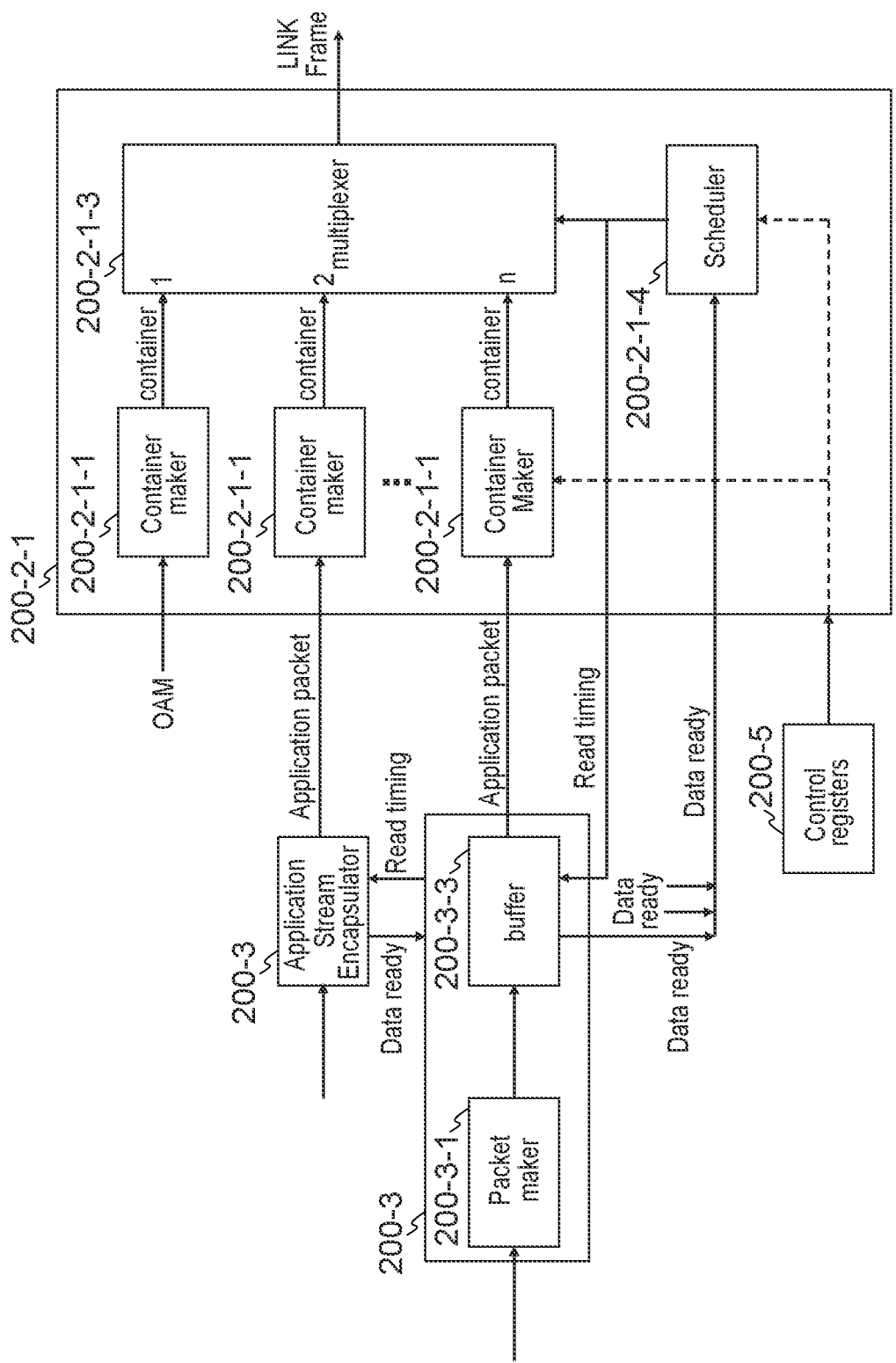
FIG. 7 is a block diagram of a frame construction unit according to a first embodiment of the present disclosure.

FIG. 7 is a block diagram of the frame construction unit 200-2-1 according to a first embodiment of the present disclosure. In FIG. 7, components common to those of the frame construction unit 200-2-1 in FIG. 4 are denoted by the same reference symbols, and the differences will be mainly described below. Similarly to FIG. 4, the frame construction unit 200-2-1 in FIG. 7 includes a plurality of container makers (container makers) 200-2-1-1 corresponding to the plurality of encapsulators 200-3, the multiplexer 200-2-1-3, and a scheduler 200-2-1-4.

In the frame construction unit 200-2-1 in FIG. 7, the operation of the scheduler 200-2-1-4 is different from the scheduler 200-2-1-4 in FIG. 4. Further, each of the encapsulators 200-3 shown in FIG. 7 stores, in the corresponding buffer 200-3-3, an application packet generated by the corresponding packet maker 200-3-1, and then outputs a data ready signal. The data ready signal is a signal indicating that a valid application packet is stored in the corresponding buffer 200-3-3. The data ready signal from each of the encapsulators 200-3 is input to the scheduler 200-2-1-4. The scheduler 200-2-1-4 controls, on the basis of the data ready signal from each of the encapsulators 200-3, the order of causing the container generated by each of the container makers 200-2-1-1 to be included in the transmission frame.

Figure 8:
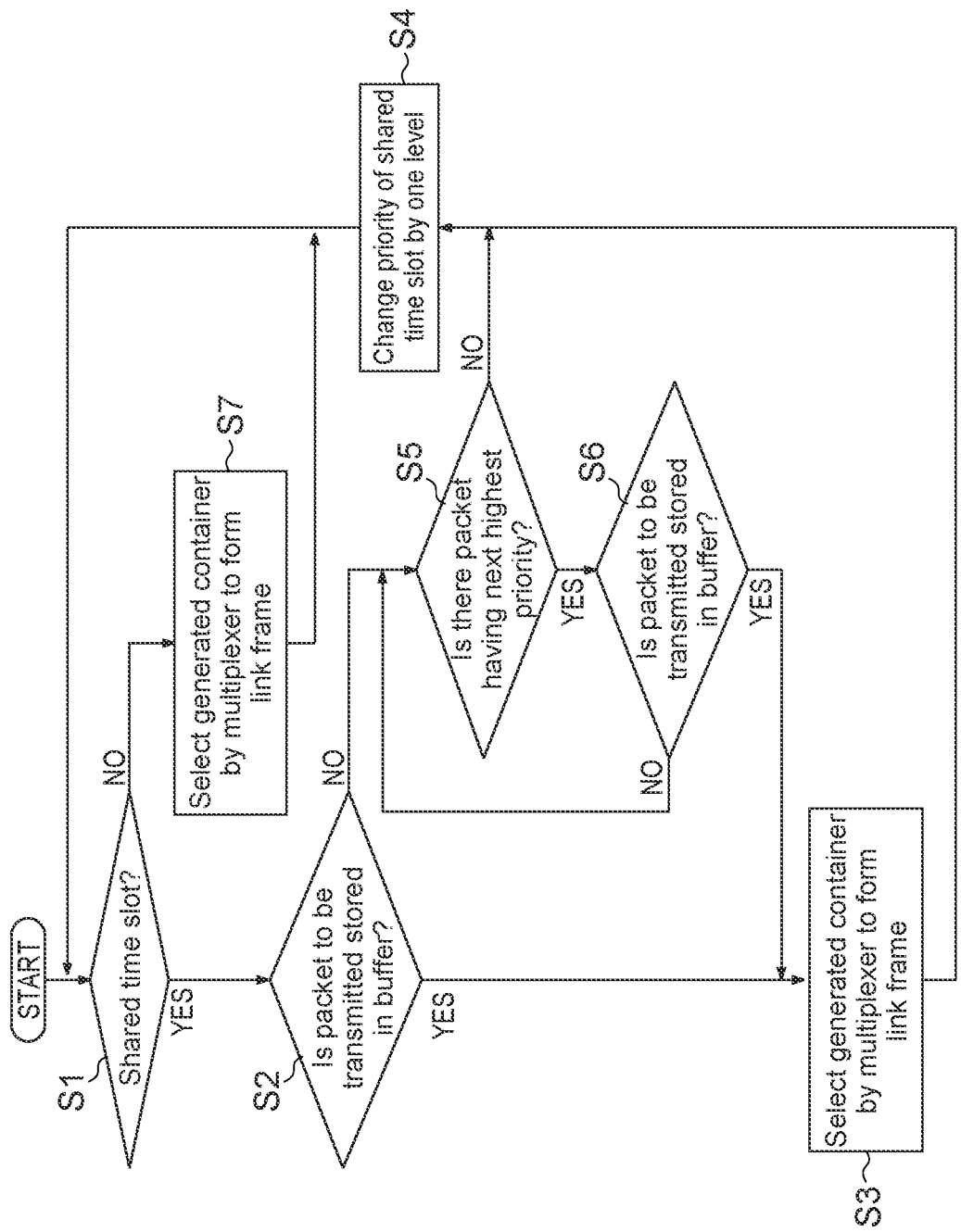
FIG. 8 is a flowchart showing a processing operation of a scheduler in FIG. 7.
Figure 9:
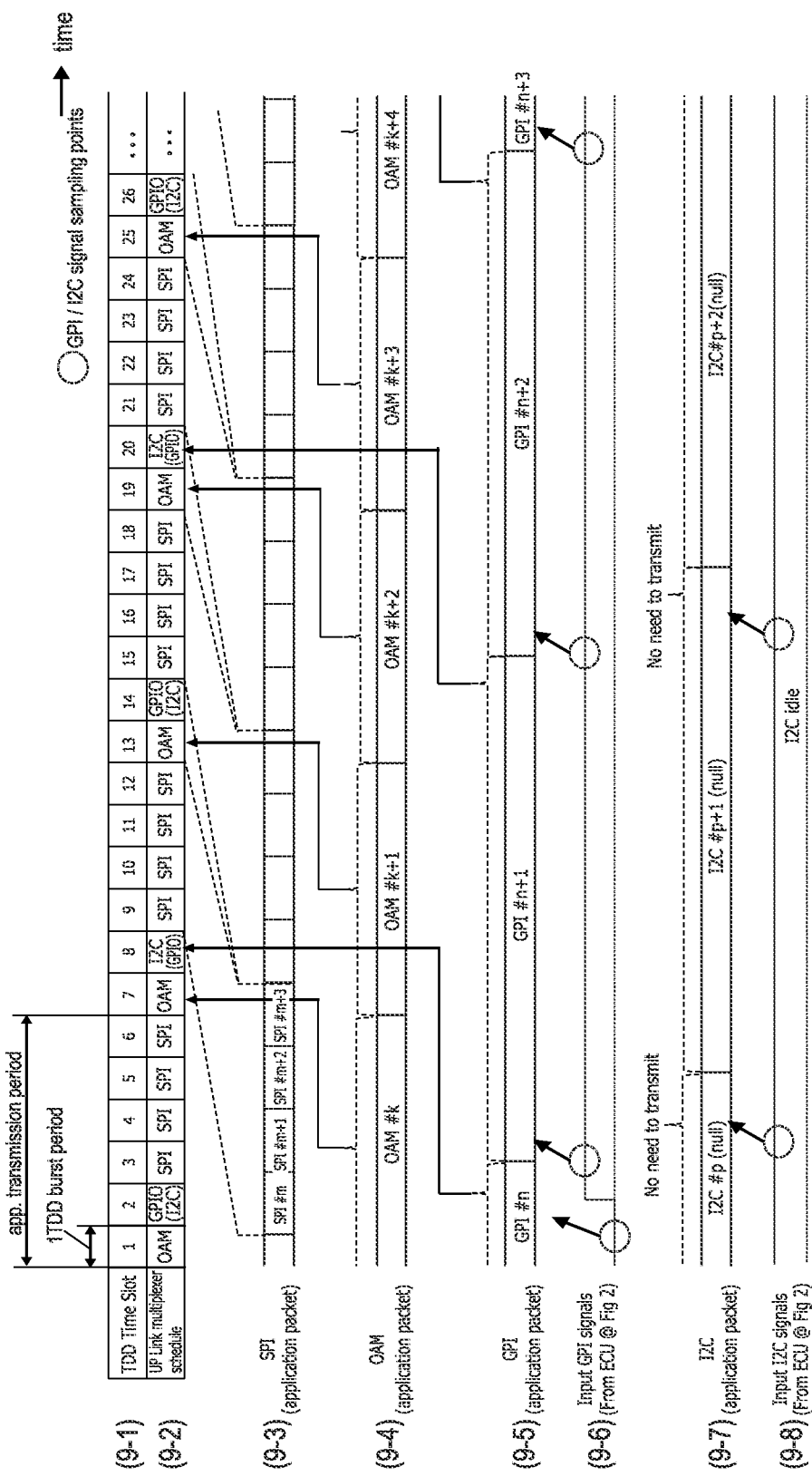
FIG. 9 is a diagram showing a transmission timing in an UP Link according to this embodiment.

FIG. 8 is a flowchart showing the processing operation of the scheduler 200-2-1-4 in FIG. 7. FIG. 9 is a diagram showing the transmission timing in the UP Link according to this embodiment. Hereinafter, the processing operation of the communication apparatus and the communications system according to this embodiment will be described on the basis of FIG. 7 to FIG. 9.

Similarly to the scheduler 200-2-1-2 in FIG. 4, the scheduler 200-2-1-4 in FIG. 7 determines in advance, before the communications system starts transmission, which application packet is assigned to which TDD time slot and transmitted by the schedule management from the ECU 100 via the control register 200-5.

The ECU 100 or the control register 200-5 prepares a specific TDD time slot (shared time slot) in the scheduler 200-2-1-4, and assigns, to the shared time slot, not one application packet but a plurality of application packets. A signal such as a control signal, which has a relatively small transmission band and a low transmission frequency, is assigned to this application packet transmitted in the specific shared time slot.

Further, the ECU 100 or the control register 200-5 sets, for the scheduler 200-2-1-4, the output priority of the application packet assigned to the shared time slot. How many shared time slots are prepared, which application packet is assigned, and how the priority is set are changed in accordance with the system and the operation situation. The priority may be determined at the time of system design, for example. That is, the order in which the priority is periodically changed may be determined at the time of system design and stored in a memory, a resister, or the like (not shown). Alternatively, a user may set the priority or the order in which the priority is changed using a, updatable value of a resister. In this case, the user can change the priority or the order in which the priority is changed by updating the value of the resister at an appropriate timing.

The scheduler 200-2-1-4 determines whether or not the TDD time slot to be scheduled is the shared time slot (Step S1). For example, TDD time slots #2, #8, #14, #20, and #26 in FIG. 9 are determined to be the shared time slots.

In the case of the shared time slot, whether or not the application packet having the highest priority is stored in the corresponding buffer 200-3-3 is determined by the data ready signal (Step S2). In the case where the application packet having the highest priority is stored in the buffer 200-3-3, it is determined that the application packet has been prepared, a container is generated by the container maker 200-2-1-1 corresponding to the application packet stored in the buffer 200-3-3, and the generated container is selected by the multiplexer 200-2-1-3 to form a link frame (Step S3).

After that, the priority of the shared time slot is changed by one level (Step S4). For example, in the case where there are application packets A, B, and C, the priority of each of five shared time slots #2, #8, #14, #20, and #26 in FIG. 9 is changed as follows. Note that the following is just an example, and the order in which the priority is changed is arbitrary.

Priority of shared time slot #2: A→B→C
Priority of shared time slot #8: B→C→A
Priority of shared time slot #14: C→A→B
Priority of shared time slot #20: A→B→C
Priority of shared time slot #26: B→C→A When the processing of Step S4 in FIG. 8 is finished, the processing of Step S1 and subsequent Steps is repeated. More specifically, for example, in FIG. 9, the priority of the TDD time slot #2 satisfies the relationship of GPIO>I2C, the priority of the next TDD time slot #8 satisfies the relationship of I2C>GPIO, and the priority of the next TDD time slot #14 satisfies the relationship of GPIO>I2C similarly to the original. As a result, it is possible to guarantee the transmission band originally assigned to the application packet. As described above, the priority of the shared time slot is switched in order for every one period.

When it is determined in Step S2 that the application packet is not stored in the buffer 200-3-3, whether or not there is an application packet having the next highest priority is determined (Step S5). When it is determined that there is an application packet having the next highest priority, whether or not the determined application packet is stored in the corresponding buffer 200-3-3 is determined by the data ready signal (Step S6). When it is determined that the determined application packet is stored in the corresponding buffer 200-3-3, the processing proceeds to Step S3. For example, although the application packet including an I2C signal has the highest priority in the TDD time slot #8 in FIG. 9, the I2C signal is null at this time point and the application packet including an I2C signal is not stored in the corresponding buffer 200-3-3. For this reason, the determination in Step S2 in FIG. 8 is NO, the processing proceeds to Step S5, and whether or not there is an application packet having the next highest priority is determined. In the TDD time slot #8 in FIG. 9, the GPIO signal has the next highest priority of the I2C signal. At this time point, the application packet including a GPIO signal is stored in the corresponding buffer 200-3-3 (GPI #n+1 Part 9-5 of FIG. 9). In this regard, the container maker 200-2-1-1 corresponding to this application packet generates a container including this application packet.

Meanwhile, in the case where it is determined in Step S5 that there is no application packet having the next highest priority, the processing proceeds to Step S4. For example, in the TDD time slot #14 in FIG. 9, the application packet including a GPIO signal has the highest priority. At this time point, an application to be transmitted is not stored in the buffer 200-3-3 in the encapsulator 200-3 for a GPIO signal. For this reason, the determination is NO in Step S2 in FIG. 8, the processing proceeds to Step S5, and whether or not there is an application packet having the next highest priority is determined. In the TDD time slot #14 in FIG. 9, the I2C signal has the next highest priority. At this time point, the I2C signal is null and a valid application packet is not stored in the corresponding buffer 200-3-3. For this reason, the determination is NO in Step S5, and the priority of the shared time slot is switched in Step S4.

When it is determined in Step S1 that the TDD time slot to be scheduled is not the shared time slot, the scheduler 200-2-1-4 selects the designated application packet, a container corresponding to the selected application packet is generated by the container maker 200-2-1-1, and the generated container is selected by the multiplexer 200-2-1-3 to form a link frame (Step S7). When the processing of Step S7 is finished, the processing of Step S1 and subsequent Steps is repeated.

As described above, in the first embodiment, when serial transmission is performed by a TDD method, one period including a plurality of TDD time slots includes a shared time slot capable of transmitting a packet including one of a plurality of types of serial signals. Since a plurality of types of application packets each including an application signal having a low transmission frequency is transmitted in the shared time slot and the priority when transmitting the plurality of types of application packets in the shared time slot is changed in order, it is possible to transmit the plurality of types of application packets with equal transmission latency. Further, by transmitting a plurality of types of application packet each having a low transmission frequency in the shared time slot, it is possible to increase the number of TDD time slots to be assigned to the application packet having a high transmission frequency and further reduce the transmission latency of the application packet having a high transmission frequency. Therefore, in accordance with this embodiment, it is possible to efficiently transmit a plurality of types of serial signals corresponding to a plurality of applications by a TDD method.

Second Embodiment

A second embodiment is different from the first embodiment in the configuration of the frame construction unit 200-2-1 in the LINK unit 200-2 and the surroundings thereof.

Figure 10:
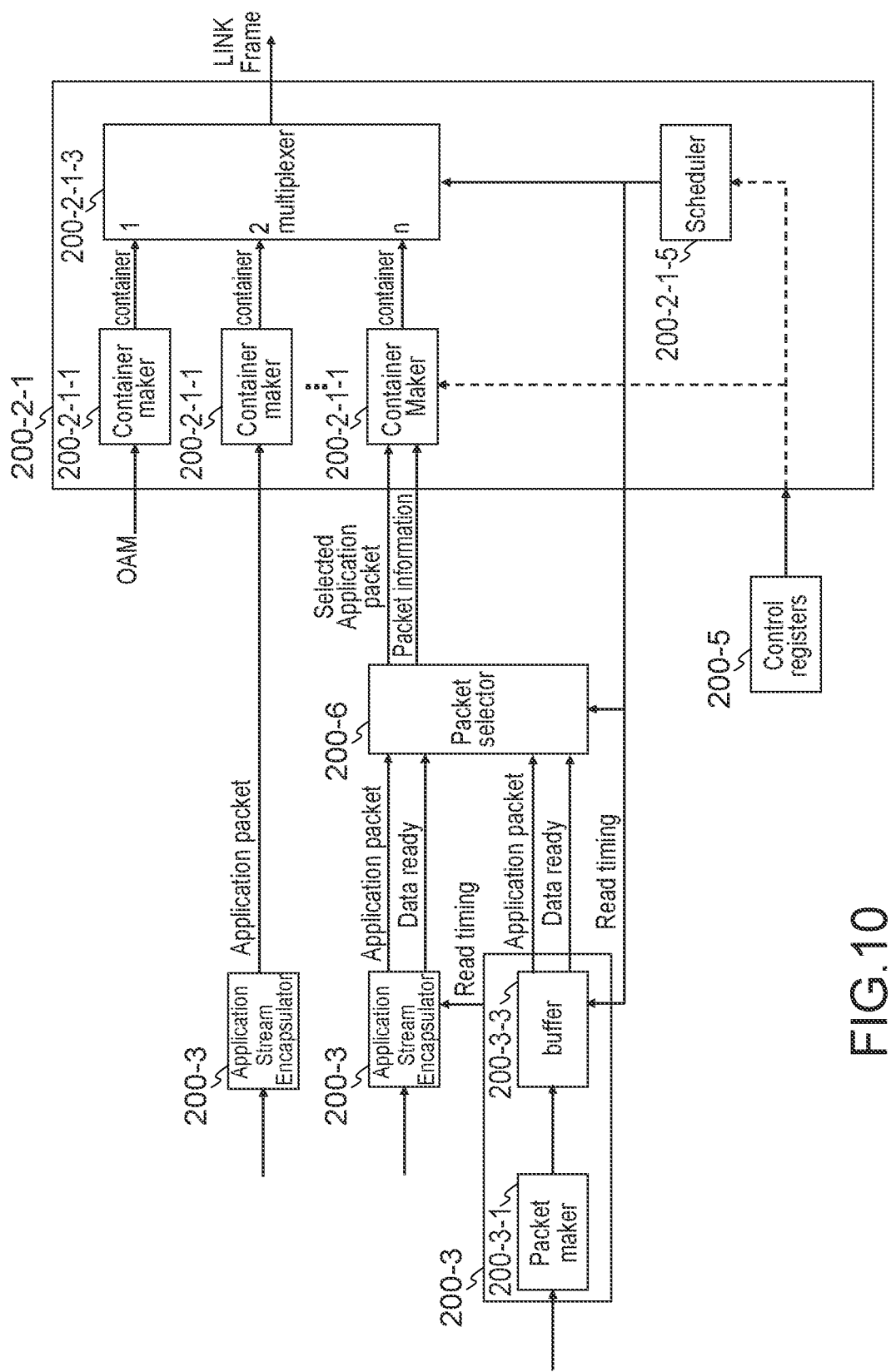
FIG. 10 is a block diagram showing a configuration of a frame construction unit and the surroundings thereof according to a second embodiment.

FIG. 10 is a block diagram showing a configuration of the frame construction unit 200-2-1 according to the second embodiment and the surroundings thereof. In the second embodiment, a packet selector 200-6 is disposed between the plurality of encapsulators 200-3 and the frame construction unit 200-2-1.

The packet selector 200-6 executes part of functions of the scheduler 200-2-1-4 in FIG. 7. Specifically, the packet selector 200-6 is connected to two or more encapsulators 200-3 each transmitting an application packet in the shared time slot. Each of the two or more encapsulators 200-3 connected to the packet selector 200-6 includes the packet maker 200-3-1 and the buffer 200-3-3. Each of the encapsulators 200-3 outputs the data ready signal when an application packet is stored in the corresponding buffer 200-3-3. The data ready signal is input to the packet selector 200-6.

The packet selector 200-6 selects, on the basis of the data ready signal from the two or more encapsulators 200-3 each transmitting an application packet in the shared time slot, an application packet to be transmitted in the shared time slot. The data ready signal is a signal indicating that the corresponding application packet is stored in the corresponding buffer 200-3-3, and is output from the corresponding encapsulator 200-3. The application packet transmitted in the shared time slot is input to the frame construction unit 200-2-1.

Similarly to FIG. 7, the frame construction unit 200-2-1 in FIG. 10 includes a plurality of container makers 200-2-1-1 (Container makers) corresponding to the plurality of encapsulators 200-3 or the OAM unit 200-2-3, the multiplexer 200-2-1-3, and the scheduler 200-2-1-5. The scheduler 200-2-1-5 in FIG. 10 is different from the scheduler 200-2-1-4 in FIG. 7.

Although the frame construction unit 200-2-1 in FIG. 7 includes the same number of the container makers 200-2-1-1 as the plurality of encapsulators 200-3, the frame construction unit 200-2-1 in FIG. 10 includes the container makers 200-2-1-1 whose number is smaller than that of the plurality of encapsulators 200-3. More specifically, one of a plurality of application packets to be transmitted in the shared time slot is selected by the packet selector 200-6, and the selected application packet is input to the dedicated container maker 200-2-1-1.

A read timing signal informing the timing of the shared time slot is input from the scheduler 200-2-1-5 to the packet selector 200-6. The packet selector 200-6 performs, when a read timing signal is input, the processing operation similar to that in the flowchart shown in FIG. 8. The packet selector 200-6 transmits, when selecting an application packet to be transmitted in the shared time slot, the application packet to the corresponding container maker 200-2-1-1 together with packet information indicating which application the application corresponds to. The corresponding container maker 200-2-1-1 generates, on the basis of the received packet information, a container header together with a container payload including the received application packet to complete a container.

The scheduler 200-2-1-5 in the frame construction unit 200-2-1 selects, setting information of the control register 200-5, a plurality of containers generated by the plurality of container makers 200-2-1-1 one by one to generate a link frame.

As described above, in the second embodiment, since the packet selector 200-6 is provided between the plurality of encapsulators 200-3 and the frame construction unit 200-2-1 to select an application packet to be transmitted in the shared time slot, it is possible to reduce the number of the container makers 200-2-1-1 in the frame construction unit 200-2-1. Further, since the packet selector 200-6 performs part of the processing of schedule management of the scheduler 200-2-1-5, it is possible to reduce the processing load of the scheduler 200-2-1-5 and simplify the internal configuration of the frame construction unit 200-2-1.

Note that the present technology may also take the following configurations.

(1) A communication apparatus, including:
a communication unit that periodically transmits, with an interval assigned by TDD (Time Division Duplex) being one TDD time slot and a plurality of TDD time slots being one period, a plurality of application packets corresponding to a plurality of serial signals generated by a plurality of applications to a communication partner device; and
a transmission control unit that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

(2) The communication apparatus according to (1), in which the transmission control unit changes, for every one period, the priority of the part of application packets in a preset order or in accordance with user's designation.

(3) The communication apparatus according to (1), in which the transmission control unit changes, for every one period, the priority of the part of application packets to be transmitted in the specific TDD time slot in order.

(4) The communication apparatus according to (1), in which the transmission control unit preferentially transmits a packet corresponding to an application having a higher priority in the specific TDD time slot.

(5) The communication apparatus according to any one of (1) to (4), in which
the transmission control unit checks whether an application having a higher priority has prepared a packet to be transmitted in the specific TDD time slot, and checks, if not prepared, whether or not an application having the next highest priority has prepared a packet to be transmitted in the specific TDD time slot.

(6) The communication apparatus according to (5), in which the transmission control unit repeats processing of checking whether or not a packet to be transmitted is prepared in descending order of priority until a packet that can be transmitted in the specific TDD time slot is found.

(7) The communication apparatus according to any one of (1) to (6), in which
the transmission control unit stops, where none of the part of applications have prepared a packet to be transmitted in the specific TDD time slot, transmitting a valid packet in the specific TDD time slot.

(8) The communication apparatus according to any one of (1) to (7), in which
the transmission control unit causes the one period to include a dedicated TDD time slot for transmitting a packet including a serial signal generated by an application designated in advance separately from the specific TDD time slot.

(9) The communication apparatus according to (8), in which the application designated in advance is an application other than the part of applications of the plurality of applications.

(10) The communication apparatus according to (8) or (9), in which
the transmission control unit increases the number of dedicated TDD time slots included in the plurality of periods to be larger than the number of specific TDD time slots.

(11) The communication apparatus according to any one of (8) to (10), in which
the part of applications include at least one of an application that generates a packet of I2C (Inter-Integrated Circuit) communication or an application that generates a packet of GPIO (General Purpose Input/Output) communication, and
the application designated in advance includes at least one of an application that generates a packet of SPI (Serial Peripheral Interface) communication or an application that generates a packet of OAM (Operation, Administration, Maintenance).

(12) The communication apparatus according to any one of (1) to (11), in which
the transmission control unit changes, for every one period, the priority of the part of applications by one level, and makes, where the priority has reached the lowest or the highest, the priority the highest or the lowest in the next period.

(13) The communication apparatus according to any one of (8) to (11), in which
the transmission control unit sets, on a basis of at least one of a transmission frequency or a signal amount of a serial signal generated by each of the plurality of applications, whether to assign the dedicated TDD time slot to the corresponding application or share the specific TDD time slot with another application.

(14) The communication apparatus according to any one of (1) to (13), further including:

a plurality of encapsulators that is provided for each of the plurality of applications, generates a packet including a serial signal generated by the corresponding application, and outputs a ready signal indicating whether or not the packet has been generated; and a frame construction unit that generates, on a basis of a plurality of packets generated by the plurality of encapsulators, a link frame to be transmitted to the communication partner device in the one period, in which the frame construction unit includes a scheduler that manages the priority of the specific TDD time slot and determines, on a basis of two or more ready signals generated by two or more encapsulators corresponding to the part of applications, the application that transmits a packet in the specific TDD time slot.

(15) The communication apparatus according to (14), in which the frame construction unit includes a plurality of container makers that generates a container including a container payload and a container header, the container payload including a packet generated by each of the plurality of encapsulators, and a multiplexer that selects, under control of the scheduler, a plurality of containers generated by the plurality of container makers one by one to generate the link frame.

(16) The communication apparatus according to (15), in which the number of the plurality of container makers is the same as the number of TDD time slots in the one period.

(17) The communication apparatus according to any one of (1) to (13), further including:

a plurality of encapsulators that is provided for each of the plurality of applications, generates a packet including a serial signal generated by the corresponding application, and outputs a ready signal indicating whether or not the packet has been generated;

a packet selection unit that manages the priority of the specific TDD time slot and selects, on a basis of two or more ready signals generated by two or more encapsulators corresponding to the part of applications, a packet to be transmitted in the specific TDD time slot from two or more packets generated by the two or more encapsulators; and a frame construction unit that generates, on the basis of the packet selected by the packet selection unit and a packet corresponding to an application other than the part of applications of the plurality of applications, a link frame to be transmitted to the communication partner device in the one period, in which the frame construction unit includes a scheduler that manages a packet to be transmitted in the plurality of TDD time slots in the one period.

(18) The communication apparatus according to (17), in which the frame construction unit includes a plurality of container makers that generates a container including a container payload and a container header corresponding to the container payload, the container payload including a packet selected by the packet selection unit and a packet corresponding to an application other than the part of applications of the plurality of applications, and a multiplexer that selects, under control of the scheduler, a plurality of containers generated by the plurality of container makers one by one to generate the link frame.

(19) The communication apparatus according to (18), in which the number of the plurality of container makers is less than the number of TDD time slots in the one period.

(20) A communications system, including:

a first communication apparatus that transmits/and receives a packet by TDD (Time Division Duplex) via a predetermined communication protocol; and a second communication apparatus, in which the first communication apparatus includes a communication unit that periodically transmits, with an interval assigned by TDD (Time Division Duplex) being one TDD time slot and a plurality of TDD time slots being one period, a plurality of application packets corresponding to a plurality of serial signals generated by a plurality of applications to a communication partner device, and a transmission control unit that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot, and the second communication apparatus includes a second communication unit that receives a packet transmitted from the first communication apparatus and periodically transmits a packet to the first communication apparatus with the plurality of TDD time slots being the one period.

(21) A communication method, including:

periodically transmitting, with an interval assigned by TDD (Time Division Duplex) being one TDD time slot and a plurality of TDD time slots being one period, a plurality of application packets corresponding to a plurality of serial signals generated by a plurality of applications to a communication partner device; and changing, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

Aspects of the present disclosure are not limited to the above-mentioned individual embodiments and include also various modifications that can be conceived by those skilled in the art, and also the effects of the present disclosure are not limited to the above-mentioned content. That is, various additions, changes, and partial deletions can be made without departing from the conceptual idea and essence of the present disclosure derived from the content specified in the claims and the equivalents thereof.

What is claimed is:

1. A communication apparatus, comprising:

an encapsulator that receives a plurality of serial signals generated by a plurality of application and outputs a plurality of application packets corresponding to the plurality of serial signals;

a transmitter that periodically transmits, with an interval assigned by TDD (Time Division Duplex) being one TDD time slot and a plurality of TDD time slots being one period, the plurality of application packets corresponding to the plurality of serial signals generated by the plurality of applications to a communication partner device; and a frame constructor that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

2. The communication apparatus according to claim 1, wherein the frame constructor changes, for every one period, the priority of the part of application packets in a preset order or in accordance with user's designation.

3. The communication apparatus according to claim 1, wherein the frame constructor changes, for every one period, the priority of the part of application packets to be transmitted in the specific TDD time slot in order.

4. The communication apparatus according to claim 1, wherein the frame constructor preferentially transmits a packet corresponding to an application having a higher priority in the specific TDD time slot.

5. The communication apparatus according to claim 1, wherein the frame constructor checks whether an application having a higher priority has prepared a packet to be transmitted in the specific TDD time slot, and checks, if not prepared, whether or not an application having the next highest priority has prepared a packet to be transmitted in the specific TDD time slot.

6. The communication apparatus according to claim 5, wherein the frame constructor repeats processing of checking whether or not a packet to be transmitted is prepared in descending order of priority until a packet that can be transmitted in the specific TDD time slot is found.

7. The communication apparatus according to claim 1, wherein the frame constructor stops, where none of the part of applications have prepared a packet to be transmitted in the specific TDD time slot, transmitting a valid packet in the specific TDD time slot.

8. The communication apparatus according to claim 1, wherein the frame constructor causes the one period to include a dedicated TDD time slot for transmitting a packet including a serial signal generated by an application designated in advance separately from the specific TDD time slot.

9. The communication apparatus according to claim 8, wherein the application designated in advance is an application other than the part of applications of the plurality of applications.

10. The communication apparatus according to claim 8, wherein the frame constructor increases the number of dedicated TDD time slots included in the plurality of periods to be larger than the number of specific TDD time slots.

11. The communication apparatus according to claim 8, wherein
the part of applications include at least one of an application that generates a packet of I2C (Inter-Integrated Circuit) communication or an application that generates a packet of GPIO (General Purpose Input/Output) communication, and
the application designated in advance includes at least one of an application that generates a packet of SPI (Serial Peripheral Interface) communication or an application that generates a packet of OAM (Operation, Administration, Maintenance).

12. The communication apparatus according to claim 8, wherein the frame constructor sets, on a basis of at least one of a transmission frequency or a signal amount of a serial signal generated by each of the plurality of applications, whether to assign the dedicated TDD time slot to the corresponding application or share the specific TDD time slot with another application.

13. The communication apparatus according to claim 1, wherein the frame constructor changes, for every one period, the priority of the part of applications by one level, and makes, where the priority has reached the lowest or the highest, the priority the highest or the lowest in the next period.

14. The communication apparatus according to claim 1, wherein:
the encapsulator is one of a plurality of encapsulators that is provided for each of the plurality of applications, generates a packet including a serial signal generated by the corresponding application, and outputs a ready signal indicating whether or not the packet has been generated;
the frame constructor generates, on a basis of a plurality of packets generated by the plurality of encapsulators, a link frame to be transmitted to the communication partner device in the one period; and
the frame constructor includes a scheduler that manages the priority of the specific TDD time slot and determines, on a basis of two or more ready signals generated by two or more encapsulators corresponding to the part of applications, the application that transmits a packet in the specific TDD time slot.

15. The communication apparatus according to claim 14, wherein
the frame constructor includes
a plurality of container makers that generates a container including a container payload and a container header, the container payload including a packet generated by each of the plurality of encapsulators, and
a multiplexer that selects, under control of the scheduler, a plurality of containers generated by the plurality of container makers one by one to generate the link frame.

16. The communication apparatus according to claim 15, wherein the number of the plurality of container makers is the same as the number of TDD time slots in the one period.

17. The communication apparatus according to claim 1, wherein:
the encapsulator is one of a plurality of encapsulators that is provided for each of the plurality of applications, generates a packet including a serial signal generated by the corresponding application, and outputs a ready signal indicating whether or not the packet has been generated;
a packet selector manages the priority of the specific TDD time slot and selects, on a basis of two or more ready signals generated by two or more encapsulators corresponding to the part of applications, a packet to be transmitted in the specific TDD time slot from two or more packets generated by the two or more encapsulators;
the frame constructor generates, on the basis of the packet selected by the packet selector and a packet corresponding to an application other than the part of applications of the plurality of applications, a link frame to be transmitted to the communication partner device in the one period; and
the frame constructor includes a scheduler that manages a packet to be transmitted in the plurality of TDD time slots in the one period.

18. The communication apparatus according to claim 17, wherein
the frame constructor includes
a plurality of container makers that generates a container including a container payload and a container header corresponding to the container payload, the container payload including a packet selected by the packet selector and a packet corresponding to an application other than the part of applications of the plurality of applications, and
a multiplexer that selects, under control of the scheduler, a plurality of containers generated by the plurality of container makers one by one to generate the link frame.

19. The communication apparatus according to claim 18, wherein the number of the plurality of container makers is less than the number of TDD time slots in the one period.

20. A communications system, comprising:
a first communication apparatus that transmits and receives packets by TDD (Time Division Duplex) via a predetermined communication protocol; and
a second communication apparatus, wherein
the first communication apparatus includes
an application stream encapsulator that receives a plurality of serial signals generated by a plurality of application and outputs a plurality of application packets corresponding to the plurality of serial signals,
a transmitter that periodically transmits, with an interval assigned by TDD (Time Division Duplex) being one TDD time slot and a plurality of TDD time slots being one period, the plurality of application packets corresponding to the plurality of serial signals generated by the plurality of applications to a communication partner device, and
a frame constructor that changes, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot, and
the second communication apparatus includes a transmitter/receiver that receives a packet transmitted from the first communication apparatus and periodically transmits a packet to the first communication apparatus with the plurality of TDD time slots being the one period.

21. A communication method, comprising:
periodically transmitting, with an interval assigned by TDD (Time Division Duplex) being one TDD time slot and a plurality of TDD time slots being one period, a plurality of application packets corresponding to a plurality of serial signals generated by a plurality of applications to a communication partner device; and
changing, for every one period, a priority of part of application packets corresponding to part of two or more applications of the plurality of applications, the part of application packets being transmitted in at least one specific TDD time slot for transmitting the part of application packets, the plurality of TDD time slots including the at least one specific TDD time slot.

* * * * *